(12) United States Patent
Buckus

(10) Patent No.: US 10,632,596 B2
(45) Date of Patent: Apr. 28, 2020

(54) APPARATUS FOR BINDING TO A SURFACE AND METHOD OF USE THEREOF

(71) Applicant: James Alan Buckus, Akron, OH (US)

(72) Inventor: James Alan Buckus, Akron, OH (US)

(73) Assignee: James Alan Buckus, Akron, OH (US)

( * ) Notice: Subject to any disclaimer, the term of this patent is extended or adjusted under 35 U.S.C. 154(b) by 159 days.

(21) Appl. No.: 15/948,481

(22) Filed: Apr. 9, 2018

(65) Prior Publication Data

US 2018/0345460 A1 Dec. 6, 2018

Related U.S. Application Data

(60) Provisional application No. 62/603,428, filed on May 30, 2017.

(51) Int. Cl.
*B25B 11/00* (2006.01)
*F16B 1/00* (2006.01)
*F16B 47/00* (2006.01)

(52) U.S. Cl.
CPC ............ *B25B 11/005* (2013.01); *F16B 1/005* (2013.01); *F16B 1/0057* (2013.01); *F16B 47/00* (2013.01)

(58) Field of Classification Search
CPC ........ B25B 11/005; B23Q 3/088; B25J 15/06; B25J 15/0616; B25J 15/065
See application file for complete search history.

(56) References Cited

U.S. PATENT DOCUMENTS

| | | | |
|---|---|---|---|
| 4,669,915 A * | 6/1987 | Shatto, Jr. | B25J 9/142 114/250 |
| 4,684,113 A | 8/1987 | Douglas et al. | |
| 5,467,525 A * | 11/1995 | Pine | B23Q 3/08 29/743 |
| 6,024,392 A | 2/2000 | Blatt | |
| 6,419,216 B1 | 7/2002 | Susnjara | |
| 6,449,848 B1 | 9/2002 | Crocker | |
| 6,554,241 B1 | 4/2003 | Leshem | |
| 6,857,627 B2 | 2/2005 | Gordon | |
| 7,281,739 B2 | 10/2007 | Kniss | |
| 7,444,742 B2 | 11/2008 | Sturm et al. | |
| 7,665,783 B2 | 2/2010 | Nishio | |
| 7,731,166 B2 * | 6/2010 | Kaiser | F16M 11/22 269/21 |
| 7,963,578 B2 | 6/2011 | Wells et al. | |
| 8,096,537 B2 | 1/2012 | Browne et al. | |
| 8,240,726 B2 | 8/2012 | Subotincic | |
| 8,382,174 B2 | 2/2013 | Desai et al. | |
| 8,469,345 B2 | 6/2013 | Samac et al. | |

(Continued)

FOREIGN PATENT DOCUMENTS

JP 2011183536 A * 9/2011

*Primary Examiner* — Tyrone V Hall, Jr.
(74) *Attorney, Agent, or Firm* — K&L Gates LLP

(57) ABSTRACT

An apparatus for binding to a select surface and a method of use thereof is provided. The apparatus comprises a body, a flexible member, and a recess. The body has a proximal surface configured with a fluid port. The flexible member has a cavity therein and is operatively coupled to the body to form a seal with the body. The flexible member is configured to expand responsive to an expansive pressure within the cavity. The recess is formed by the proximal surface and the flexible member. The fluid port is configured to facilitate generation of a binding pressure within the recess.

8 Claims, 17 Drawing Sheets

(56) References Cited

U.S. PATENT DOCUMENTS

| | | |
|---|---|---|
| 8,584,997 B2 | 11/2013 | Hajianpour |
| 8,734,083 B2 | 5/2014 | Negre et al. |
| 8,960,745 B2 | 2/2015 | Regan et al. |
| 8,960,749 B2 | 2/2015 | Fukano et al. |
| 8,960,751 B2 | 2/2015 | Regan et al. |
| 9,108,319 B2 | 8/2015 | Kniss et al. |
| 9,597,757 B2 | 3/2017 | Pesenti et al. |
| 9,623,570 B1* | 4/2017 | Krahn ................ B25J 15/0023 |
| 9,758,311 B2 | 9/2017 | Bindelli et al. |
| 2008/0127474 A1 | 6/2008 | McAllister |
| 2013/0300045 A1* | 11/2013 | Komatsu ................ B23Q 3/088 269/21 |

* cited by examiner

APPARATUS FOR BINDING TO A SURFACE AND METHOD OF USE THEREOF

CROSS-REFERENCE TO RELATED PATENTS

This application claims priority to U.S. Provisional Application 62/603,428 filed on May 30, 2017, the disclosure of which is entirely incorporated herein by this reference as if fully set forth herein.

BACKGROUND

A workpiece may be subjected to an operation such as, for example, processing, movement, and/or combinations thereof. The workpiece can be bound to a tool in order to hold the workpiece in a position and/or enable controlled movement of the workpiece during the operation. The tool can be, for example, a fixture, a handle, a jig, a frame, a guide, a box, a hold-down device, and/or combinations thereof. Binding of the workpiece to the tool can affect the features and/or surfaces of the workpiece. For example, a tool, such as a vise, can bind to a workpiece by squeezing the workpiece between two parallel jaws. The squeezing can apply a pressure to a surface of the workpiece and cause damage if the applied pressure is too great.

A hold-down device such as, for example, a suction cup can bind to a workpiece. Typically, the suction cup can bind to the surface by pressing the suction cup against a surface of the workpiece. The suction cup generally binds to the surface responsive to the pressing due to creation of a suction force caused by removing air from an enclosed space between the suction cup and the surface. The suction cup can cause minimal, if any, damage to the workpiece and/or can leave minimal, if any, residue on the surface after removal of the suction cup.

SUMMARY

In one aspect, the present disclosure provides an apparatus for binding to a select surface. The apparatus for binding comprises a body, a flexible member, and a recess. The body has a proximal surface configured with a fluid port. The flexible member has a cavity therein and is operatively coupled to the body to form a seal with the body. The flexible member is configured to expand responsive to an expansive pressure within the cavity. The recess is formed by the proximal surface and the flexible member. The fluid port is configured to facilitate generation of a binding pressure within the recess.

In another aspect, the present disclosure provides an apparatus for binding to a select surface. The apparatus for binding comprises a body, a flexible member, and a recess. The body has a proximal surface configured with a fluid port. The flexible member is operatively coupled to the body to form a seal with the body. The flexible member has at least two chambers including a first chamber and a second chamber. The first chamber has a first cavity therein and is configured to contract responsive to a first contractive pressure within the first cavity. The second chamber has a second cavity therein and is configured to expand responsive to a first expansive pressure within the second cavity. The recess is formed by the proximal surface and the flexible member. The fluid port is configured to facilitate generation of a binding pressure within the recess.

In another aspect, the present disclosure provides a method for binding a select surface to an apparatus for binding. More specifically, the apparatus for binding is positioned in a sealable relationship with the select surface. The apparatus for binding comprises a body, a flexible member, and a recess. The body has a proximal surface. The flexible member has a cavity therein and is operatively coupled to the body to form a seal with the body. The recess is formed by the proximal surface and the flexible member. The flexible member expands by generating an expansive pressure within the cavity. A binding pressure is generated within the recess to bind the select surface in a first position to the apparatus for binding.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent and the examples will be better understood by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the embodiments in any manner.

DETAILED DESCRIPTION

Figure 1A:
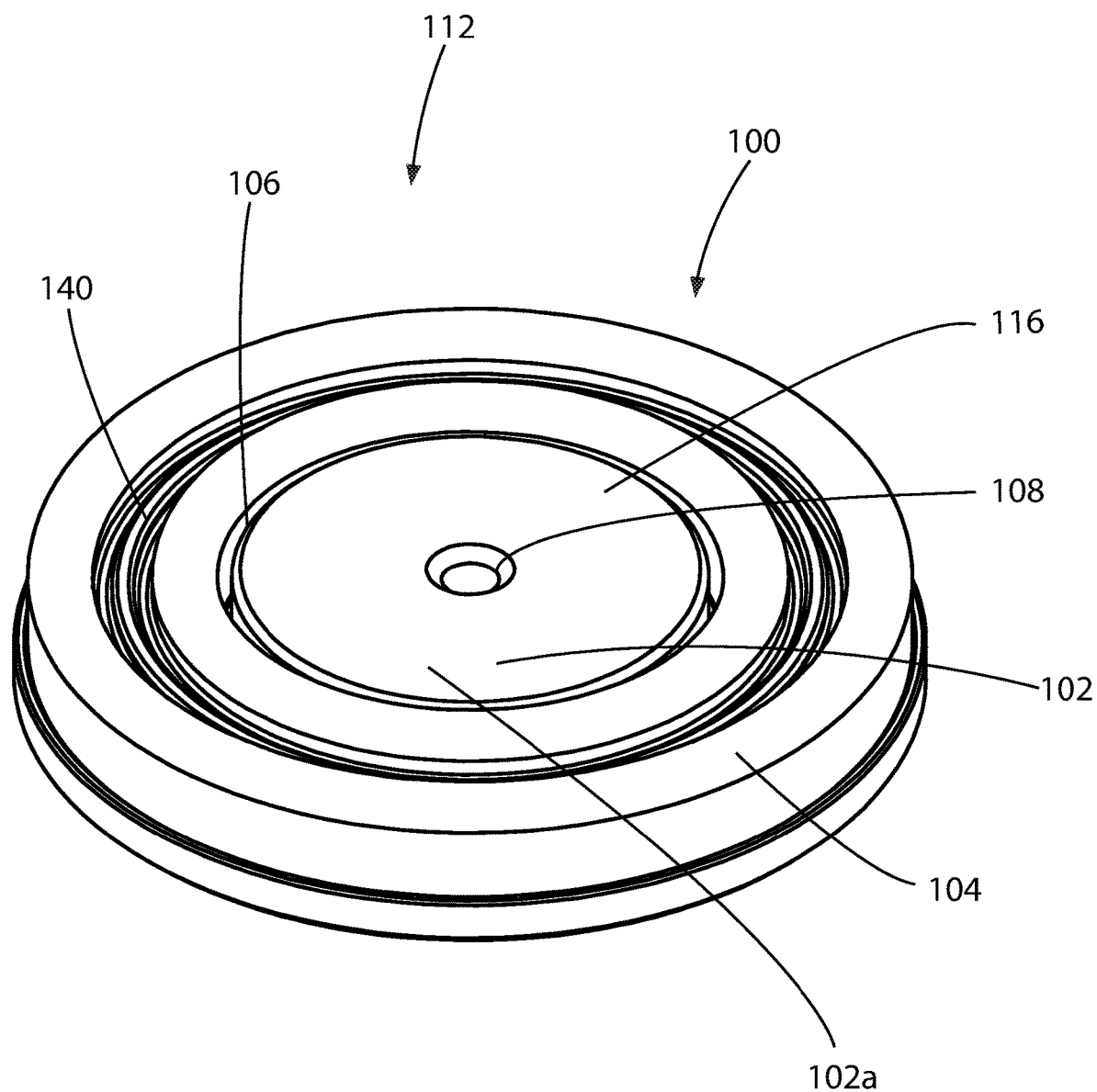
FIG. 1A is a perspective view of an apparatus for binding to a select surface.

Certain exemplary aspects of the present disclosure will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," or "an example", or the like, means that a particular feature, structure, or characteristic described in connection with the example is included in at least one example. Thus, appearances of the phrases "in various examples," "in some examples," "in one example", or "in an example", or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. § 112 and 35 U.S.C. § 132(a).

A tool can be attached and/or fixed to a select surface of a workpiece through various methods to subject the workpiece to an operation. The workpiece may be, for example, a body, a part, a component, a product, an article, and/or combinations thereof. Various manufacturing applications utilize a tool comprising a hold-down device such as, for example, a suction cup to bind to the workpiece. The workpiece may be positioned in a select location and orientation relative to the tool in order to facilitate the performance of the operation. The positioning can include contact between the workpiece and a contact surface of the tool. However, the positioning may require that the suction cup is moved away from the contact surface of the tool while the workpiece is being positioned so that the suction cup does not prematurely engage with the workpiece and limit, and in various examples prevent, further positioning.

Suction cups can be attached to an external active device which can enable movement of the suction cup away from the contact surface. The external active device may be configured with an active component such as, for example, a pivoting bracket, a linear rail, and/or a hydraulic/pneumatic actuator to enable the movement of the suction cup. However, the active component can add complexity and cost to the tool. Additionally, there may be a lack of space for the active component on the tool and/or within a system utilizing the tool.

Improper positioning of the workpiece relative to a tool can adversely affect the quality of a product created from the workpiece, cause delays in performance of an operation on the workpiece, and/or inhibit performance of an applied or corresponding system, such as, for example, a computer numeric control (CNC) machine. For example, improper positioning of the workpiece can lead to malfunction of the CNC machine, incorrect placement of features within the workpiece, incorrect feature parameters, an improper binding force between the workpiece and the tool, and/or breaking of the workpiece.

Thus an apparatus for binding to a select surface is provided that may offer various advantages: enable accurate, efficient, and/or repeated positioning of the select surface relative to the apparatus for binding, control engagement with the select surface; and/or to limit complexity of a tool. More specifically, the present disclosure provides an apparatus for binding to a select surface of a workpiece that may comprise a body, a flexible member, and a recess. The body has a proximal surface configured with a fluid port. The flexible member may have a cavity therein and is operatively coupled to the body to form a seal with the body. The recess may be formed by the proximal surface and the flexible member. The flexible member may be configured to expand responsive to an expansive pressure within the cavity and can engage with the select surface. The fluid port can facilitate generation of a binding pressure within the recess wherein the apparatus for binding can be bound to the select surface by, for example, a suction force.

In certain examples, the apparatus for binding can enable placement of a workpiece with limited, if any, interference from premature application of a suction force and/or interference from a gasket. The apparatus for binding can have various uses such as, for example, securing and/or manipulating a part for trimming, routing, sanding, welding, applying adhesive, applying a coating, assembling, machining, handling, lifting, and/or combinations thereof. In various examples, the workpiece can be a difficult to hold workpiece such as, for example, a contoured, large, semi-rigid, and/or flexible workpiece.

Referring to FIGS. 1A-D, an apparatus 100 for binding to a select surface is provided. As shown, the apparatus 100 for binding comprises a body 102 and a flexible member 104. The body 102 may be operatively coupled to the flexible member 104, and the body 102 can physically support the flexible member 104. For example, the body 102 can support a shape of the flexible member 104 and/or a position of the flexible member 104. In various examples, the body 102 can be a central hub, as illustrated, encompassed either symmetrically or otherwise, by the flexible member 104 and engaged therewith. The body 102 may be formed of various materials, such as, for example, a metal, a plastic, a wood, a glass, composites thereof, and/or combinations thereof. When the body 102 is a metal, for example, the metal may be, for example, iron, steel, stainless steel, aluminum, titanium, and/or combinations thereof. When the body 102 is a plastic, the plastic may be, for example, a thermoset plastic, a thermoplastic, and/or combinations thereof. In various examples, the body 102 can be semi-rigid and/or rigid.

The body 102 can be physically attached to the flexible member 104. The physical attachment may be accomplished by, for example, a bonding process such as, an adhesive bonding process, a fusion process, a vulcanization process, fasteners, and/or combinations thereof. In various examples, the body 102 may be physically attached to the flexible member 104 such that a seal 106 can be formed between the body 102 and the flexible member 104. In various examples, the seal 106 can be fluid tight, such as, for example, liquid tight, air tight, and/or combinations thereof.

Figure 1B:
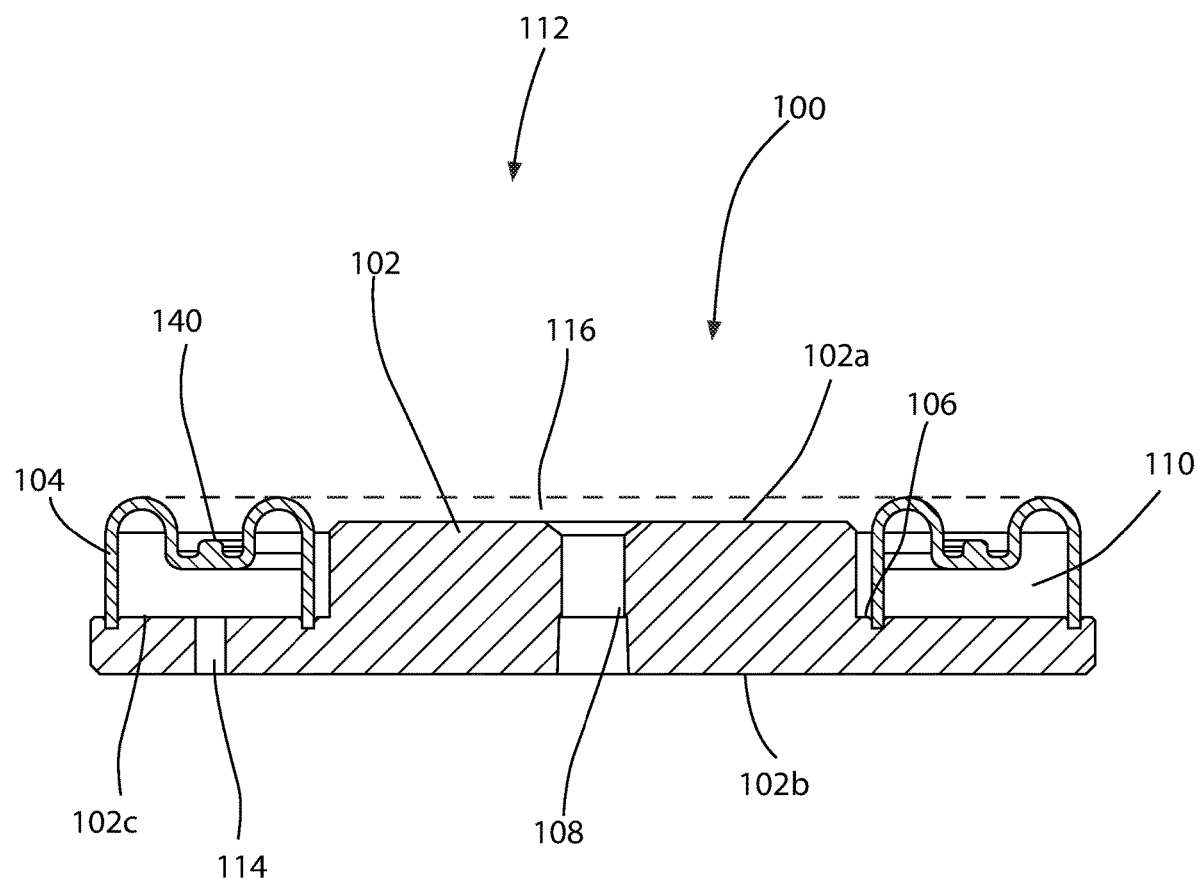
FIG. 1B is a cross-sectional view cut along line A-A of the apparatus for binding of FIG. 1A.
Figure 1C:
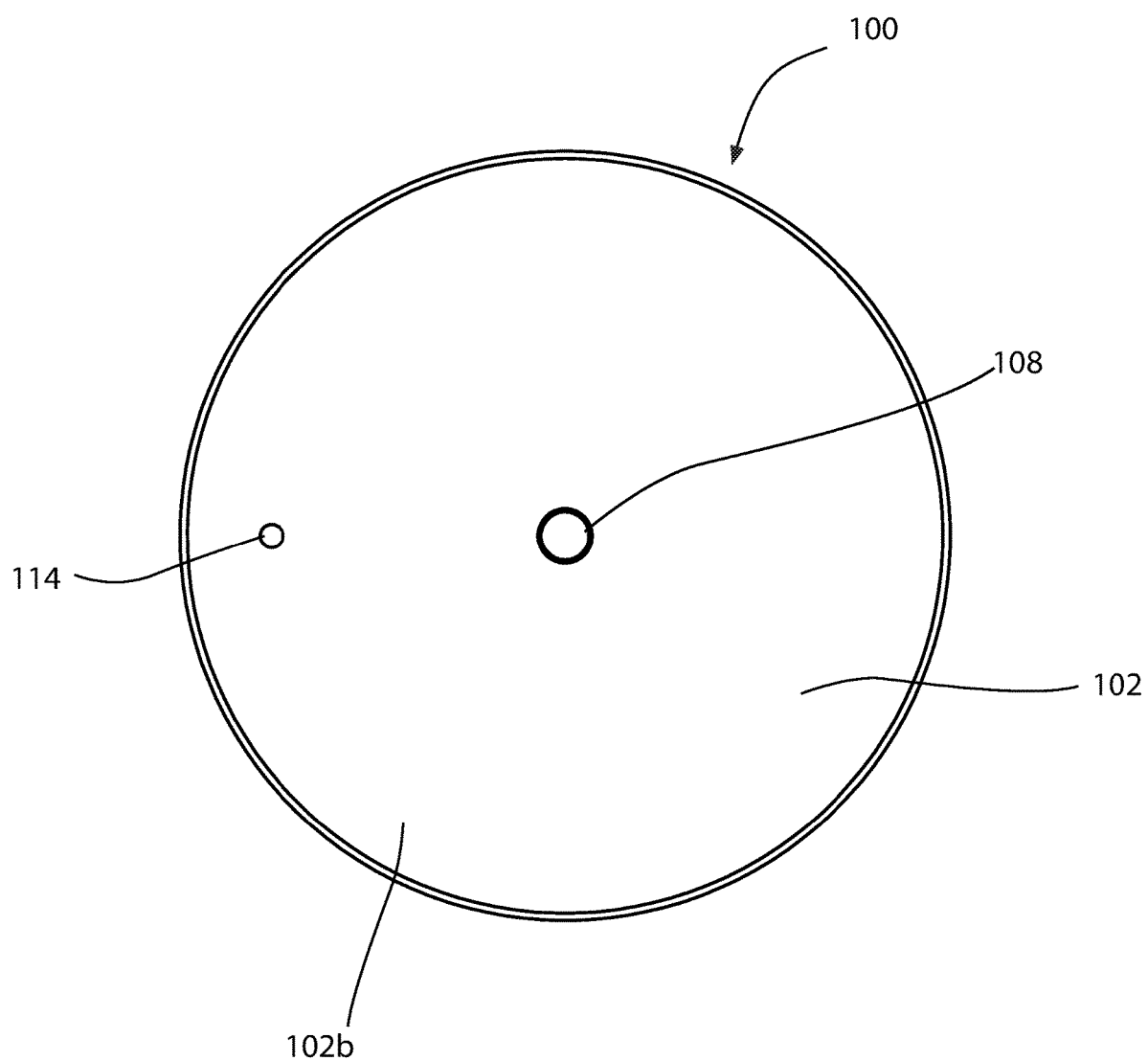
FIG. 1C is a bottom view of the apparatus for binding.
Figure 1D:
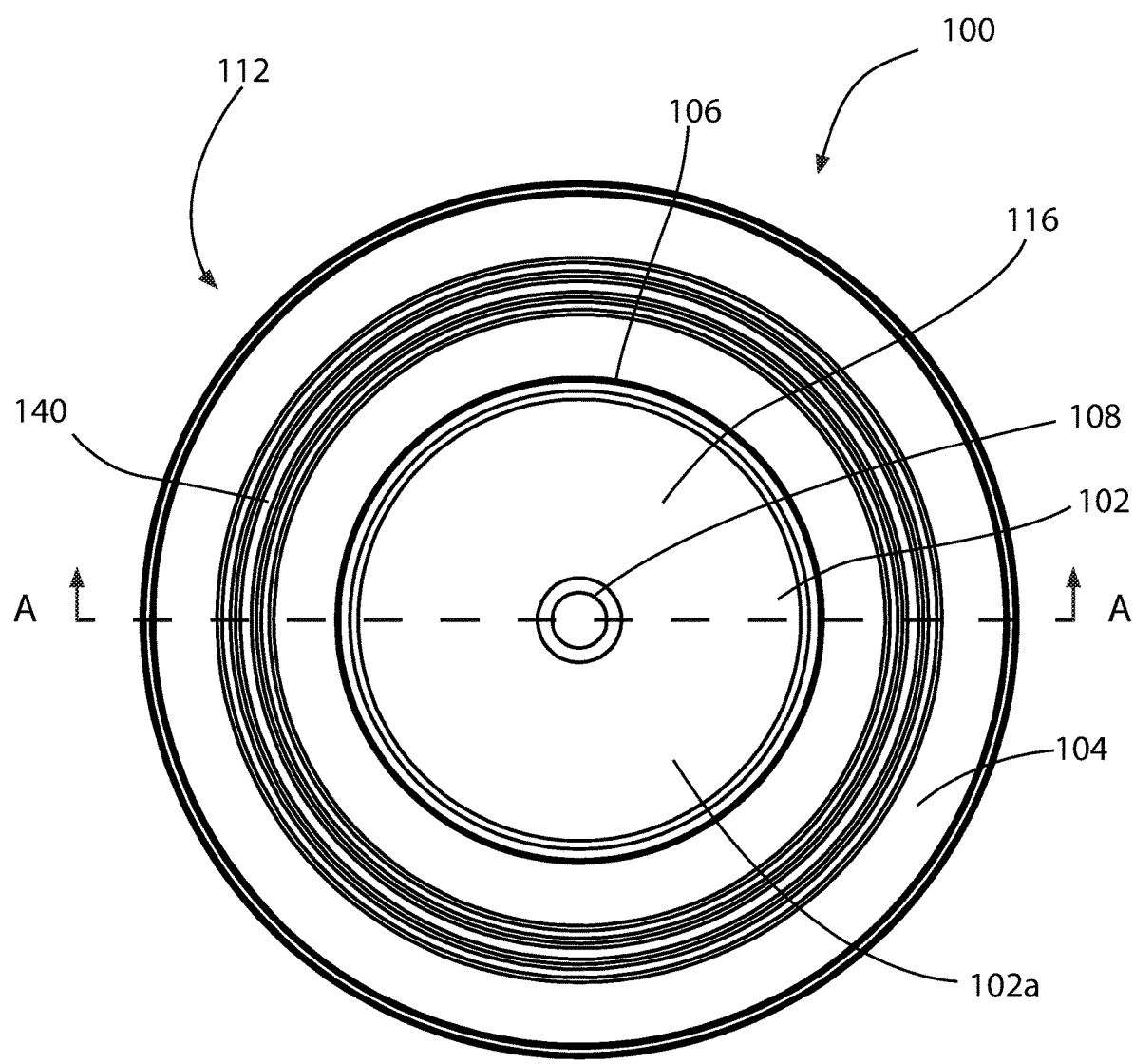
FIG. 1D is a top view of the apparatus for binding.

As best illustrated in FIG. 1B, the body 102 may have a proximal surface 102a and an oppositely disposed distal surface 102b. A recess 116 may be formed by the proximal surface 102a and the flexible member 104 by, for example, the difference in relative height of the proximal surface 102a and the flexible member 104. In various examples, the recess 116 may have a concave shape. When the apparatus 100 is employed to bind to a select surface of a workpiece, the recess 116 can be configured to be positioned in communication with the select surface such that when the recess 116 has a binding pressure and the flexible member 104 is in contact with the select surface, the apparatus 100 can be bound to the select surface. The binding of an apparatus for binding to a select surface will be further shown and described in FIGS. 3A-D, herein. The binding pressure may be, for example, a pressure that is less than an environmental pressure in an environment 112 outside of the recess 116 and/or external to the apparatus 100. In various examples, the environmental pressure can be atmospheric pressure (e.g., 14.6 pounds per square inch absolute (PSIA)) and the binding pressure can be less than atmospheric pressure, such as less than 14 PSIA, less than 10 PSIA, less than 5 PSIA, or less than 1 PSIA. For example, in certain examples, the binding pressure can be in a range of 0.1 PSIA to 10 PSIA.

The body 102 may be configured with a fluid port 108. In various examples, the fluid port 108 extends through the body 102, from the proximal surface 102a to the distal surface 102b of the body 102. The fluid port 108 can be configured to facilitate transfer of a fluid such as, for example, a gas and/or a liquid, into and/or out of the recess 116. A transfer of a fluid out of the recess 116 through the fluid port 108, such as by vacuum, can decrease the recess pressure to form a seal between the apparatus 100 and the select surface of the workpiece. Similarly, a transfer of a fluid through the fluid port 108 and into the recess 116 can increase the recess pressure within the recess 116 to release the apparatus 100 from the select surface of the workpiece. The positioning and the configuration of the fluid port 108 is for illustration purposes and the fluid port 108 may be configured in various manners and positioned in a variety of locations which facilitate transfer of a fluid into and/or out of the recess 116.

The flexible member 104 may be a tubular member and configured with a cavity 110 therein to expand responsive to an expansive pressure within the cavity 110. In various examples, the flexible member 104 may be a tubular member. In various examples, the flexible member 104 can encompass the recess 116, as illustrated. The flexible member 104 may comprise, for example, an elastomer that may expand responsive to an expansive pressure within the cavity 110 and contract responsive to a contractive pressure within the cavity 110. The elastomer may be, for example, a rubber, a silicon, a fluoroelastomer, a fiber reinforced elastomer, and/or combinations thereof.

The expansion of the flexible member 104 can include an increase in a size of the flexible member 104. The expansive pressure may be, for example, a pressure that is greater than the environmental pressure. In various examples, the environmental pressure can be atmospheric pressure and the expansive pressure is greater than atmospheric pressure, such as at least 15 PSIA, at least 20 PSIA, at least 30 PSIA, or at least 45 PSIA. For example, the expansive pressure can be in a range of 20 to 100 PSIA.

The flexible member 104 can be configured to contract, such as by deflation, responsive to a contractive pressure within the cavity 110. The contraction of the flexible member 104 can include a decrease in the size of the flexible member 104. The contractive pressure may be, for example, a pressure that is less than the environmental pressure in the environment 112. In some examples, the environmental pressure can be atmospheric pressure and the contractive pressure is less than atmospheric pressure, such as less than 14 PSIA, less than 10 PSIA, less than 5 PSIA, or less than 1 PSIA. For example, the contractive pressure can be 0.1 to 10 PSIA. In various examples, the contractive pressure is less than the expansive pressure.

The flexible member 104 can be deformable responsive to contact with a select surface of the workpiece and the flexible member 104 can form a seal with the select surface. For example, the formation of a seal with the select surface is shown and described in FIG. 3C herein. In various examples, when the flexible member 104 forms the seal with the select surface, fluid transfer to and from the recess 116 can be limited to the fluid port 108. The deformability of the flexible member 104 can enable engagement with uneven areas of the select surface.

The flexible member 104 can comprise a pressure port 114 configured to facilitate transfer of a fluid into and/or out of the cavity 110. A transfer of fluid into the cavity 110 can increase a cavity pressure within the cavity 110. Similarly, a transfer of fluid out of the cavity 110 can decrease the cavity pressure. In various examples, the pressure port 114 can extend from the distal surface 102b of the body 102 to a tertiary surface 102c of the body 102. The configuration and position of the pressure port 114 is for illustration purposes and the pressure port 114 may be configured in various manners and positioned in a variety of locations which facilitate transfer of a fluid to and/or from the cavity 110. In various examples, the pressure port 114 and/or fluid port can be, for example, a channel, a conduit, a tube, and/or combinations thereof.

In various examples, the tertiary surface 102c can be in direct communication with the cavity 110. In various examples, the flexible member 104 can be in direct contact with the tertiary surface 102c. In various examples, the flexible member 104 may have a wall (not shown) positioned between the tertiary surface 102c and the cavity 110 such that the cavity 110 can be enclosed. In various examples, a pressure controller can be operatively coupled to at least one of the pressure port 114 and the fluid port 108 and can control the recess pressure and/or the cavity pressure.

In various examples, the flexible member 104 can comprise a sealing member 140. The sealing member 140 can be configured to form a seal with the select surface of the workpiece. The sealing member 140 can be, for example, a seal, a gasket, a grommet, and/or combinations thereof. A seal may be, for example, an O-ring, a bulb seal, a packing seal, a ring seal, and/or combinations thereof. The sealing member 140 can be configured to move from a neutral position to a sealing position responsive to an expansion of the flexible member 104. In various examples, the sealing position can be further from the body 102 than the neutral position. The movement of the sealing member 140, for example, is shown and described in FIGS. 3B-C.

Figure 2A:
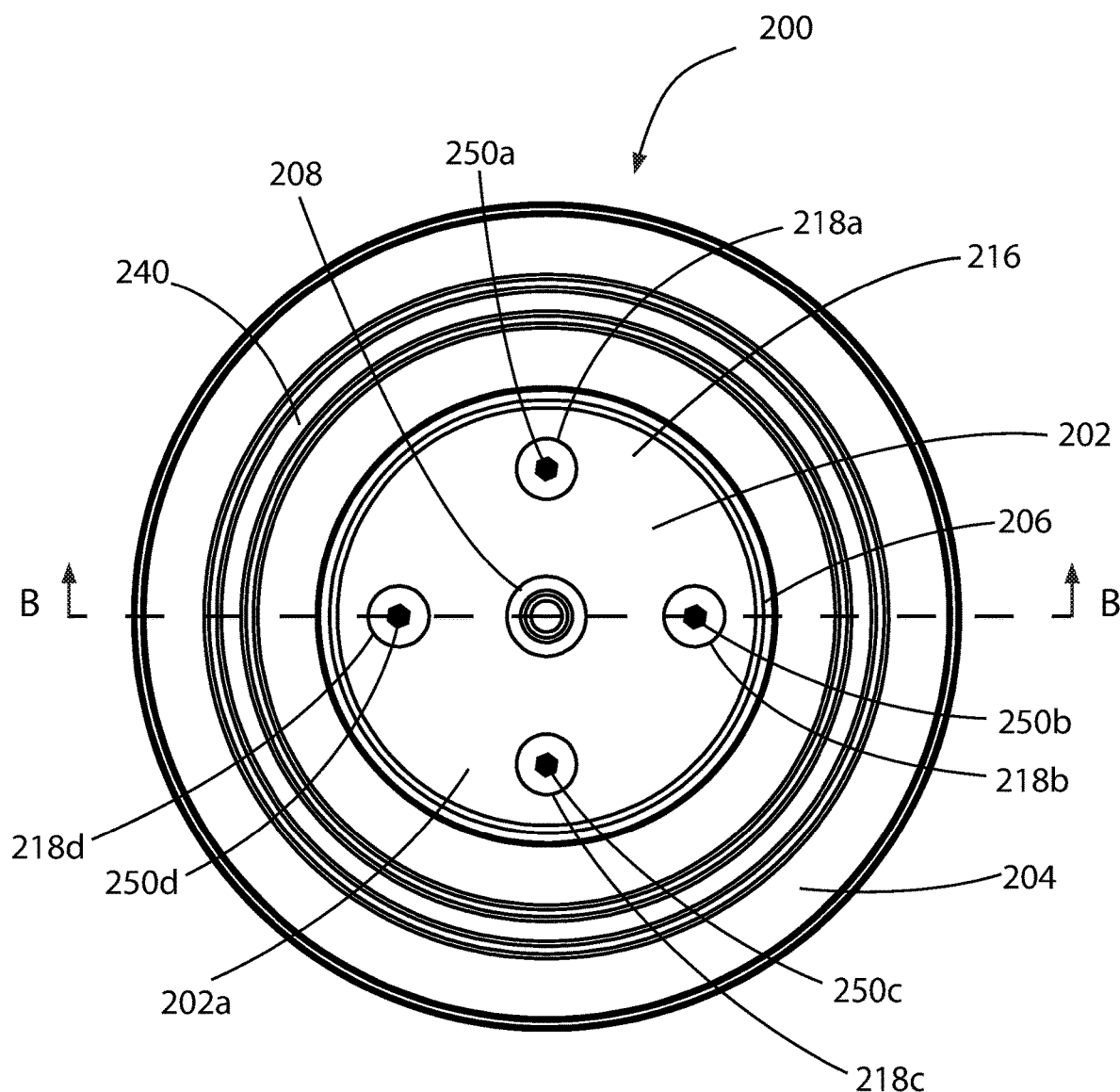
FIG. 2A is a top view of an apparatus for binding having at least two chambers.
Figure 2B:
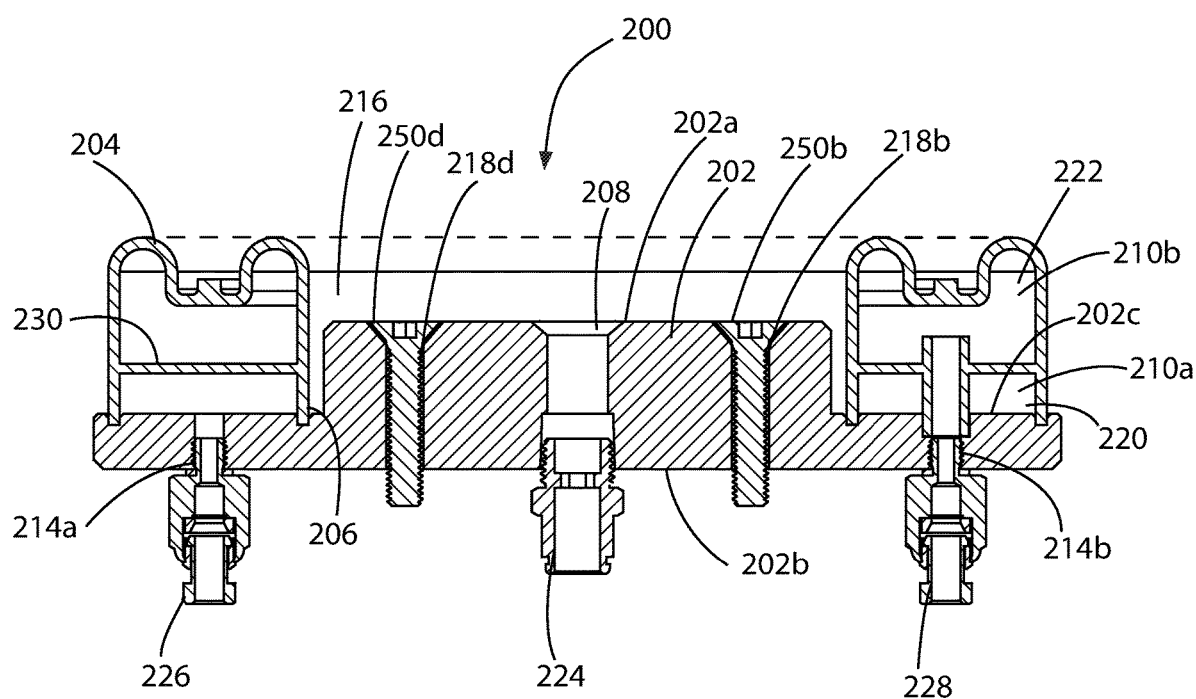
FIG. 2B is a cross-sectional view cut along line B-B of the apparatus for binding of FIG. 2A.

Referring to FIGS. 2A-B, an apparatus 200 for binding to a select surface and having at least two chambers is provided. As shown, the apparatus 200 for binding comprises a body 202 and a flexible member 204. The body 202 is operatively coupled to the flexible member 204. For example, the body 202 may be physically attached to the flexible member 204. In various examples, the body 202 may be physically attached to the flexible member 204 such that a seal 206 can be formed between the body 202 and the flexible member 204. In various examples, the seal 206 can be fluid tight.

The body 202 has a proximal surface 202a and an oppositely disposed distal surface 202b. A recess 216 may be formed by the proximal surface 202a and the flexible member 204. The recess 216 can be configured to be positioned in communication with the select surface such that when the recess 216 has the binding pressure, the apparatus 200 for binding can be bound to the select surface.

The body 202 can be configured with a fluid port 208. In various examples, the fluid port 208 extends through the body 202, from the proximal surface 202a to the distal surface 202b. The fluid port 208 can be configured to facilitate transfer of a fluid into and/or out of the recess 216. The fluid port 208 can be configured to receive a fitting 224. The fitting 224 may be, for example, an air fitting, a hydraulic fitting, and/or combinations thereof. In various examples, the body 202 can be configured with two or more fluids ports (not shown).

In various examples, the body 202 can comprise a hole configured to receive a respective fastener. In various examples, as illustrated, the body 202 can comprise a plurality of holes, for example hole 218a which can be configured to receive fastener 250a; hole 218b which can be configured to receive fastener 250b; hole 218c which can be configured to receive fastener 250c; and hole 218d which can be configured receive fastener 250d. The fasteners 250a-d may be various fasteners known to those of ordinary skill in the art such as, for example, a screw, a nail, a rivet, a bolt, a stud, a nut, and/or combinations thereof. Each hole 218a-d can extend from the distal surface 202b of the body 202 to the proximal surface 202a. The number and configuration of holes 218a-d and fasteners 250a-d is for illustration purposes and should not be considered limiting.

The flexible member 204 may be configured with at least two chambers, including a first chamber 220 and a second chamber 222, as illustrated. The first chamber 220 can be configured with a first cavity 210a and the second chamber 222 can be configured with a second cavity 210b. The first chamber 220 and the second chamber 222 can share a common wall 230 which separates the first cavity 210a from the second cavity 210b. The separation of the cavities, 210a and 210b, can enable individual control of each chamber 220 and 222. For example, the separation of cavities 210a and 210b enables a first cavity pressure within the first cavity 210a to be the same or different from a second cavity pressure within the second cavity 210b. In various examples, either or both of the first chamber 220 and the the second chamber 222 can be enclosed. The number of chambers is for illustration purposes and should not be considered limiting as the flexible member 204 can be configured with various quantities of chambers.

The first chamber 220 and the second chamber 222 can be configured to contract and/or expand. For example, the first chamber 220 can be configured to expand responsive to an expansive pressure within the first cavity 210a. Similarly, the second chamber 222 can be configured to expand responsive to the expansive pressure within the second cavity 210b. Additionally, the first chamber 220 can be configured to contract responsive to a contractive pressure within the first cavity 210a. Similarly, the second chamber 222 can be configured to contract responsive to a contractive pressure within the second cavity 210b. The expansion of the first chamber 220 and/or second chamber 222 can increase a size of the flexible member 204 and the contraction of the first chamber 220 and/or second chamber 222 can decrease a size of the flexible member 204.

The first chamber 220 and the second chamber 222 can be controlled individually and/or collectively. For example, both the first chamber 220 and the second chamber 222 can simultaneously be expanded or contracted. In various examples, only one of the first chamber 220 and second chamber 222 may be expanded or contracted at a time. In various examples, the first and second chambers, 220 and 222, could be performing different functions simultaneously. For example, the first chamber 220 could be contracting while the second chamber 222 is expanding. Similarly, for example, the first chamber 220 could be expanding while the second chamber 222 is contracting. Accordingly, the expansion and/or contraction of each chamber, 220 and 222, can be controlled individually and/or collectively based on the functionality required by the application.

The flexible member 204 can comprise a first pressure port 214a configured to facilitate transfer of a fluid into and/or out of the first cavity 210a. In various examples, the first pressure port 214a can extend from the distal surface 202b of the body 202 to a tertiary surface 202c of the body 202. The tertiary surface 202c can be in direct communication with the first cavity 210a. In various examples, the first chamber 220 can be in direct contact with the tertiary surface 202c. The flexible member 204 may have a wall (not shown) positioned between the tertiary surface 202c and the first cavity 210a to provide further functionality and control within the individual chambers. In various examples, the first pressure port 214a can be configured to receive a fitting 226. The fitting 226 may be, for example, an air fitting, a hydraulic fitting, and/or combinations thereof.

The flexible member 204 can comprise a second pressure port 214b configured to facilitate transfer of a fluid into and/or out of the second cavity 210b. In various examples, the second pressure port 214b can extend from the distal surface 202b of the body 202 through the tertiary surface 202c of the body 202 to the common wall 230. In various examples, the second pressure port 214b may be positioned within the first pressure port 214a. For example, the first pressure port 214a and the second pressure port 214b may be positioned concentrically with respect to one another. In various examples, the second pressure port 214b can be configured to receive a fitting 228. The fitting 228 may be, for example, an air fitting, a hydraulic fitting, and/or combinations thereof.

Figure 3A:
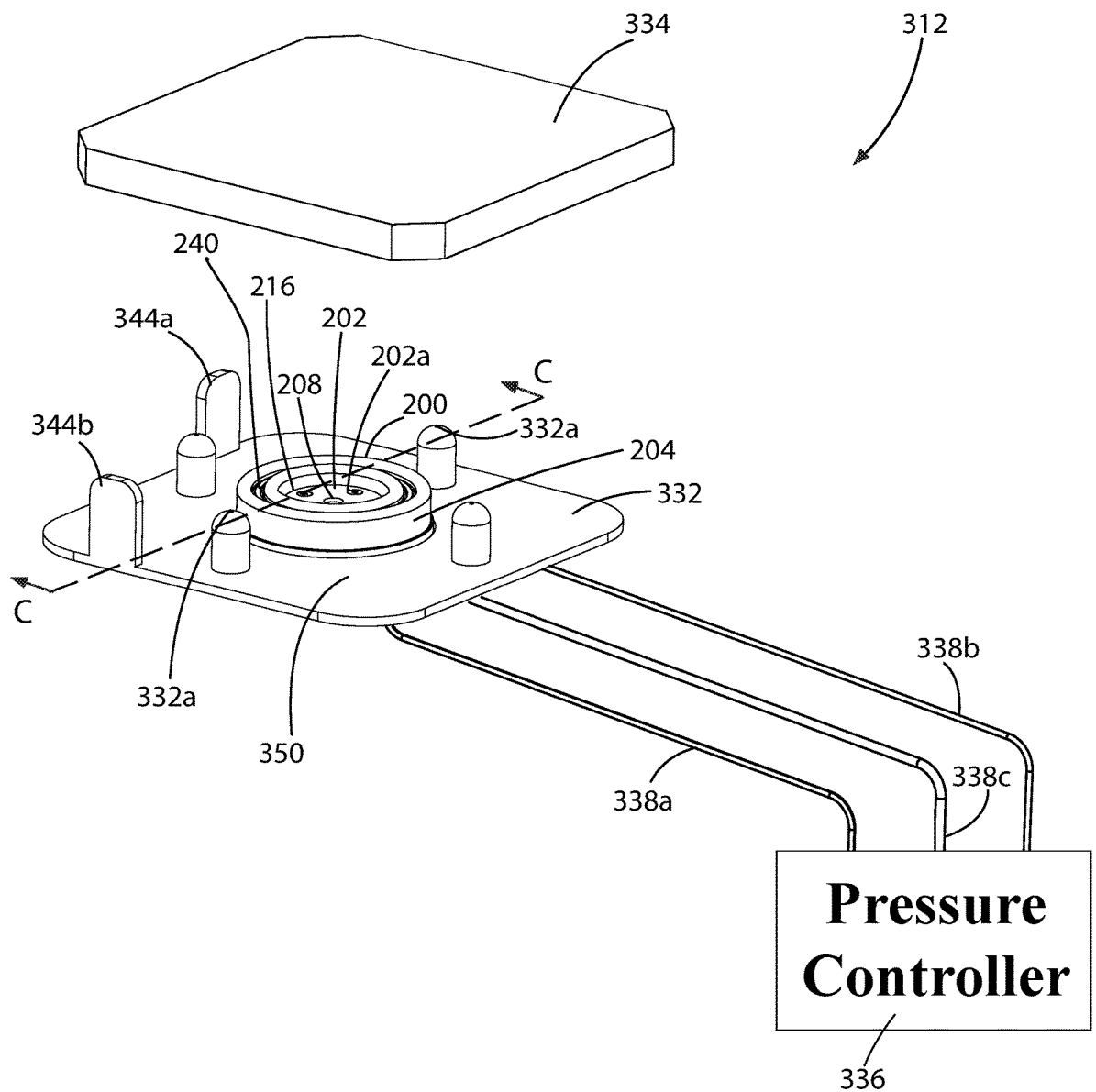
FIG. 3A is a perspective view of the apparatus for binding in a first configuration.
Figure 3B:
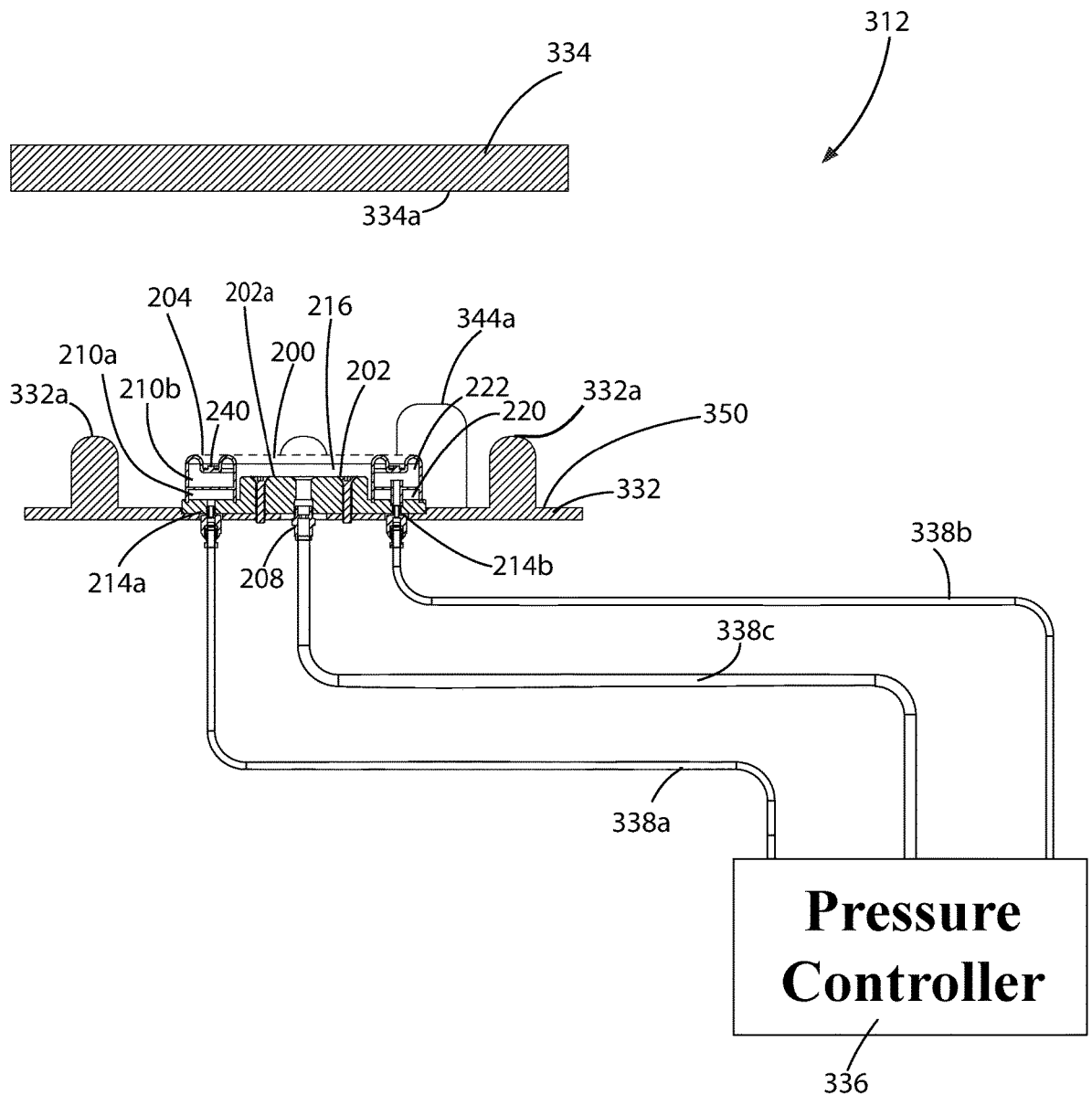
FIG. 3B is a cross-sectional view cut along line C-C of the apparatus for binding of FIG. 3A in the first configuration.

Referring to FIGS. 3A-B, the apparatus of the present invention is shown in the form of apparatus 200 for binding a select surface of a workpiece 334 in a first configuration and positioned on a tool 332. It should be noted that the description set forth herein as it relates to FIGS. 3A-B employs apparatus 200 as one example of the present invention, although the various apparatuses of the present invention disclosed and contemplated herein may be employed in like manner. Accordingly, the application of apparatus 200 is illustrative only and is used herein to describe the operation of the various examples of the present invention.

In various examples, the apparatus 200 may be secured to the tool 332. For example, the tool 332 and the apparatus 200 may be physically attached by, for example, a fastener, an adhesive, and/or a press fit. In various examples, the apparatus 200 can be positioned centrally with respect to a first end 350 of the tool 332. The tool 332 and the apparatus 200 can bind to a workpiece 334. While the workpiece 334 is bound to the apparatus 200, the workpiece can be subject to an operation such as, for example, processing, movement, and/or combinations thereof. In various examples, and as noted above, the apparatus 100 can be positioned on tool 332.

A pressure controller 336 can be operatively coupled to the first pressure port 214a via a first fluid channel 338a and can control the first cavity pressure of the first cavity 210a. Similarly, the pressure controller 336 can be operatively coupled to the second pressure port 214b via a second fluid channel 338b and can control the second cavity pressure of the second cavity 210b. The pressure controller 336 can be operatively coupled to the fluid port 208 via a third fluid channel 338c and can control the recess pressure of the recess 216. The pressure controller 336 may comprise, for example, a valve, a vacuum source, a pressure source, and/or combinations thereof. In various examples, there may be two or more pressure controllers operatively coupled to the first pressure port 214a, second pressure port 214b, fluid port 208, and/or combinations thereof. The configuration of the fluid channels 338a-c and the pressure controller 336 is for illustration purposes and should not be considered limiting.

The pressure controller 336 can individually and/or collectively control the first cavity pressure, the second cavity pressure, and/or the recess pressure. For example, the pressure controller 336 can increase or decrease one of the pressures or two or more of pressures simultaneously. In various examples, the pressure controller 336 can simultaneously increase a pressure while decreasing another pressure. Accordingly, the pressure controller 336 can dynamically control various pressures within the apparatus 200 for binding.

The tool 332 can be configured with a tab stop. In various examples, as illustrated, the tool 332 can have multiple tabs stops such as tab stop 344a and 344b. While the apparatus 200 for binding is in the first configuration, the workpiece 334 can be positioned in an alignment with the tool 332. In various examples, the alignment includes positioning the workpiece in contact with the contact surface 332a of the tool 332 and/or the tab stops, 344a and 344b. The tab stops 344a and 344b can limit positioning of the workpiece 334 relative to the tool 332 by physically contacting the workpiece 334 and/or can act as a guide to prevent further positioning of the workpiece 334 relative to the tool 332 and facilitate placement of the workpiece 334.

In the first configuration of the apparatus 200, the flexible member 204 can be in the neutral position as shown in FIGS. 3A-B. For example, the first chamber 220 and the second chamber 222 may be in the neutral position where the first cavity pressure within the first cavity 210a and the second cavity pressure within the second cavity 210b are substantially equal to an environmental pressure in an environment 312 outside of the first and second cavities 210a, 210b. For example, the first cavity 210a and the second cavity 210b may be at atmospheric pressure in the neutral position. In the neutral position, the flexible member 204 can be limited, and in some examples prevented, from engaging the select surface 334a of the workpiece 334. For example, the flexible member 204 and/or the sealing member 240 can be positioned substantially even with and/or below a contact surface 332a of the tool 332 such that engagement (e.g., contact) between the flexible member 204 and the select surface 334a can be limited, and in some examples prevented in the neutral position.

Limiting engagement between the flexible member 204 and the select surface 334a can enable accurate, efficient, and/or repeatable placement of the workpiece 334 in alignment with the tool 332. For example, limiting the flexible member 204 from engaging the select surface 334a, may allow the operator to limit or prevent suction forces between the select surface 334a and the flexible member 204 while the workpiece 334 is being positioned. In various examples, the select surface 334a of the workpiece 334 can first be positioned in contact with the contact surface 332a of the tool 332 and then the workpiece 334 can be slid along the contact surface 332a until the workpiece 334 contacts the tab stops, 344a and 334b. Because the apparatus 200 is in the first configuration, there may be minimal, if any, suction forces between the workpiece 334 and the apparatus 200 during the positioning of the workpiece 334 into this orientation. Thus, the workpiece 334 can avoid a premature application of a suction force caused by accidental engagement with the flexible member 204 which can limit accurate placement of the workpiece 334.

Figure 3C:
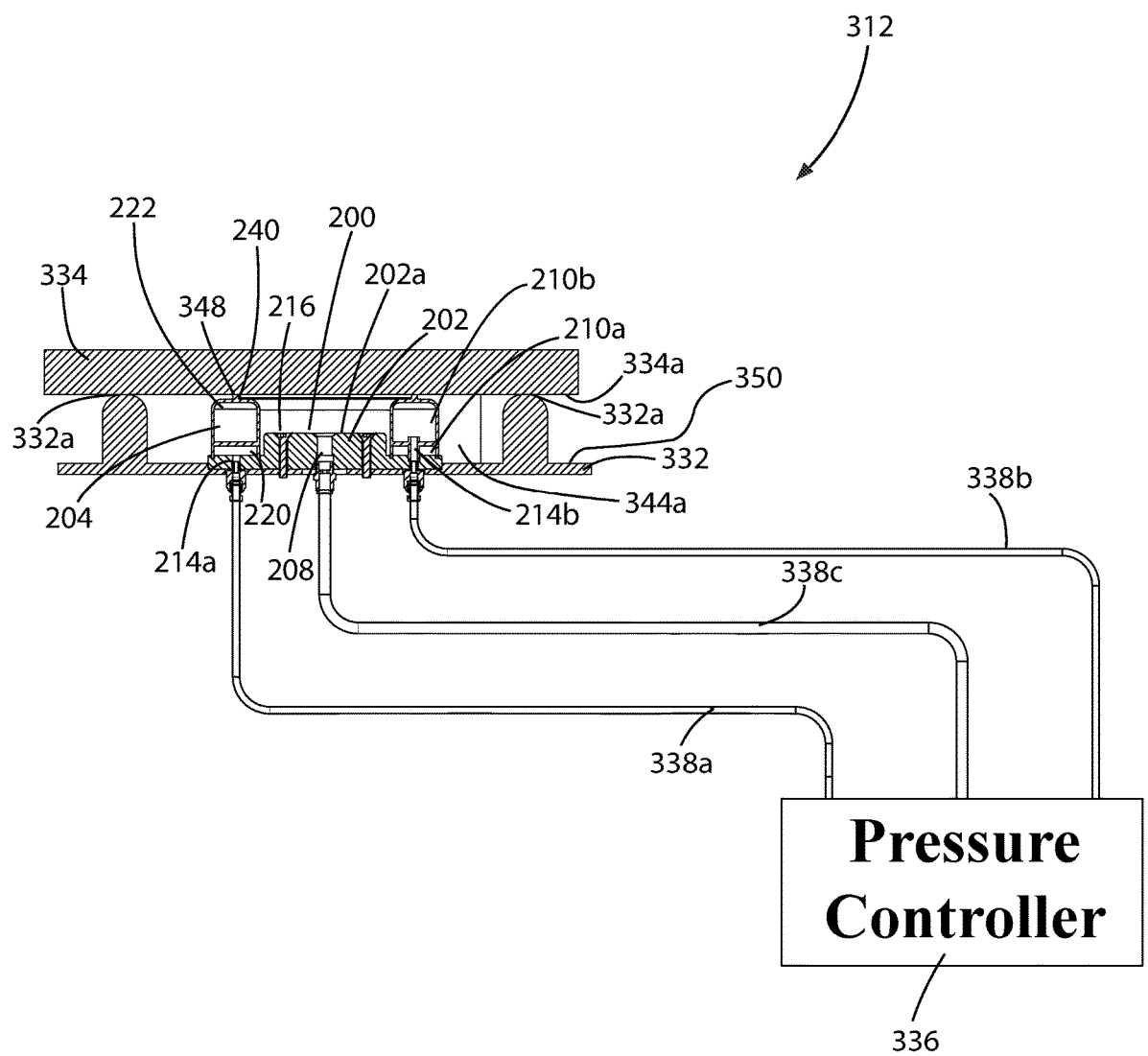
FIG. 3C is a cross-sectional view of the apparatus for binding in a second configuration.

Referring to FIG. 3C, the apparatus 200 is shown in a second configuration and positioned in a sealable relationship with the select surface 334a. For example, an active movement of the apparatus 200 from the first configuration to the second configuration can dynamically form the sealable relationship with the select surface 334a. The sealable relationship can enable the generation of the binding pressure within the recess 216 by limiting, and in various examples preventing, fluid transfer between the recess 216 and the environment 312.

In the second configuration, the flexible member 204 can be in a sealing position where the second chamber 222 has expanded responsive to the second cavity 210b having an expansive pressure. In various examples, in the second configuration, the recess 216 has an applied binding pressure. In various examples, the expansive pressure and the binding pressure can be generated by the pressure controller 336. For example, once the apparatus is in the second configuration, the pressure controller 336 can function to increase the cavity pressure within the second cavity 210b to an expansive pressure by adding fluid to the second cavity 210b. Contemporaneously therewith or at a separate time the pressure controller 336 may decrease the recess pressure within the recess 216 to the binding pressure by removing fluid from the recess 216.

The expansion of the second chamber 222 increases a size of the flexible member 204 in FIG. 3C relative to FIG. 3B and enables contact between the flexible member 204 and the select surface 334a. In various examples, the recess 216 increases in size in FIG. 3C relative to FIG. 3B responsive to the expansion of the second chamber 222. The flexible member 204 deforms responsive to contact with the select surface 334a and forms a close contact or a seal 348 between the flexible member 204 and the select surface 334a. The seal 348 limits, and in some examples prevents, fluid transfer between the environment 312 and the recess 216 thereby enabling generation of the binding pressure within the recess 216. In various examples, in the second configuration, the recess 216 can be encompassed by the flexible member 204, the body 202, and the select surface 334a and fluid transfer into and/or out of the recess 216 can be limited to the fluid port 208.

The binding pressure can create a suction force between the apparatus 200 and the select surface 334a such that the select surface 334a can be bound to the apparatus 200 in a first position in FIG. 3C. In various examples, the select surface 334a can be removed from the apparatus 200 for binding by removing the binding pressure from the recess 216 and/or overcoming the suction force by applying a removal force on the apparatus 200, tool 332, and/or workpiece 334. In various examples, the removal force is larger than the suction force.

Figure 3D:
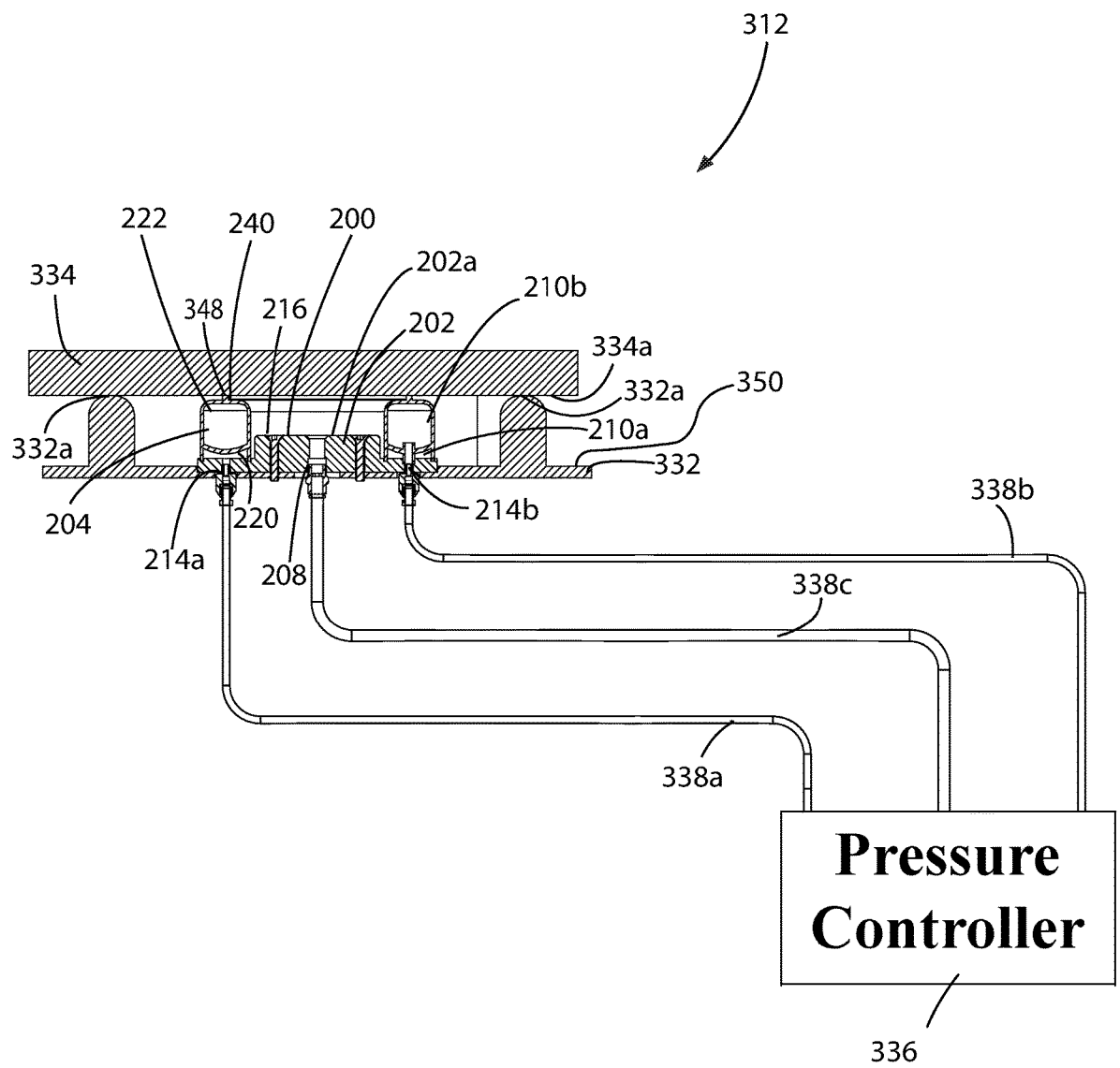
FIG. 3D is a cross-sectional view of the apparatus for binding in a third configuration.

Referring to FIG. 3D, the apparatus 200 is illustrated in a third configuration and the select surface 334a is in a second position. In the third configuration, the flexible member 204 can be in a hold-down position where the first cavity 210a has contracted responsive to the first cavity 210a having a contractive pressure, the second cavity 210b has the expansive pressure, and the recess 216 has the binding pressure. In various examples, the contraction of the first chamber 220 decreases a size of the flexible member 204 in FIG. 3D relative to FIG. 3C. In various examples, the decrease in size of the first chamber 220 moves the select surface 334a including workpiece 334 to a second position relative to the body 202.

In various examples, the contractive pressure can be generated by the pressure controller 336. For example, the pressure controller 336 can decrease the first cavity pressure within the first cavity 210a to the contractive pressure by removing fluid from the first cavity 210a.

In various examples, in the third configuration, responsive to the contraction of the first chamber 220 contact can occur between the select surface 334a of the workpiece 334 and the contact surface 332a of the tool 332. For example, the second position can be closer to the body 202 than the first position. In various examples, the contraction of the first chamber 220 can create a hold-down force on the workpiece 334 which can limit, and in various examples prevent, movement of the workpiece 334. In various examples, the second position can include the hold-down force on the workpiece 334 while the first position does not include the hold-down force. In various examples, the first and second position may be the same and the second position includes the hold-down force.

The tool 332 may not require an external active device to facilitate binding of the apparatus 200 and the select surface 334a. Since the tool 332 does not require an external active device, the cost, size, and/or complexity of the tool 332 can be lower than a tool with an external active component. However, an external active component can be used with the tool 332. For example, an external active component can be operatively coupled to the apparatus 200 in order to move the apparatus 200 for binding relative to the workpiece 334. The movement of the apparatus 200 by the external active device can engage and/or disengage the select surface 334a from the flexible member 204. In various examples, the tool 332 can be a prime mover which can enable active movement of the apparatus 200. For example, the tool 332 may be a 'pogo' style, flexible, and/or re-configurable tool.

Figure 4:
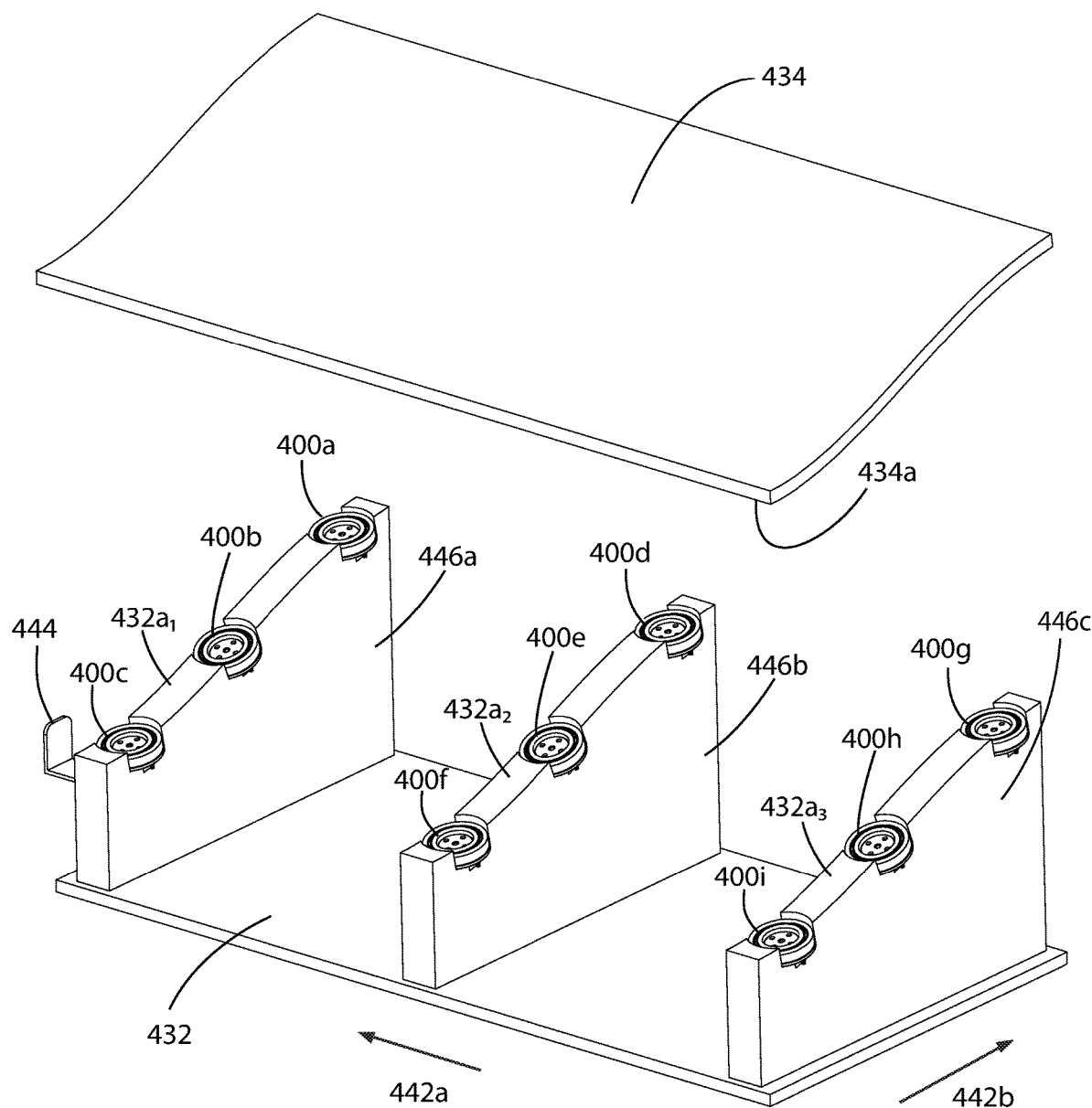
FIG. 4 is perspective view of a tool having a plurality of apparatuses for binding to a select surface.

Referring to FIG. 4, in another example, a tool 432 is shown with a plurality of apparatuses 400a-i for binding to a select surface 434a of a workpiece 434. As illustrated, the select surface 434a is contoured. The tool 432 has a plurality of portions configured to communicate with the contoured select surface 434a. More specifically, the tool 432 has a first portion 446a comprising apparatuses 400a-c for binding, a second portion 446b comprising apparatuses 400d-f for binding, and a third portion 446c comprising apparatuses 400g-i for binding. Although the first, second, and third portions 446a, 446b, and 446c are shown with three apparatuses for binding, one of ordinary skill in the art would appreciate that any number of apparatuses may be employed. Each apparatus 400a-i can be controlled independently and/or simultaneously with each other apparatus 400a-i. In various examples, the apparatuses 400a-i can be controlled by one or more pressure controllers.

When the apparatuses 400a-i for binding are in the first configuration, as previously illustrated and described in FIG. 3A-B, minimal, if any, suction forces are created between each apparatus 400a-i and the workpiece 434. Therefore, the workpiece 434 can be accurately, efficiently, and/or repeatedly positioned in alignment with the tool 432. For example, the workpiece 434 can be moved in a first direction 442a or a second direction 442a with minimal force while the workpiece 434 is in contact with a contact surface $432a_1$ of the first portion 446a, a contact surface $432a_2$ of the second portion 446b, and/or a contact surface $432a_3$ of the third portion 446c since the flexible member of each apparatus 400a-i is in a neutral position. In various examples, the flexible member of each apparatus 400a-i can be positioned below the respective contact surface, $432a_{1-3}$, of the respective portion, 446a-c. In various examples, the workpiece 434 can be slid in direction 442a until the workpiece 434 engages a tab stop 444 and/or is in alignment with the tool 432 and/or the workpiece can be slide in direction 442b until the workpiece is in alignment with the tool 432.

Figure 5A:
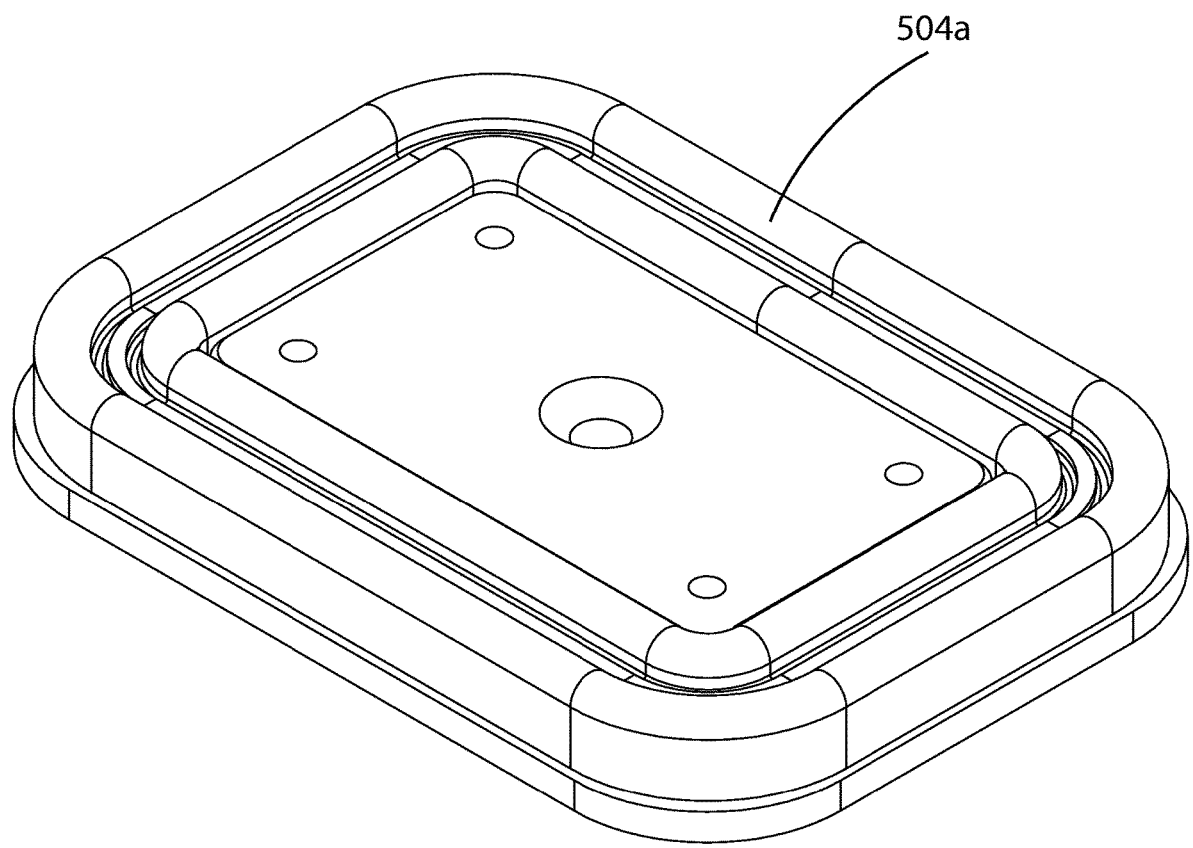
FIG. 5A is an apparatus for binding with a rectangular-shaped flexible member.
Figure 5B:
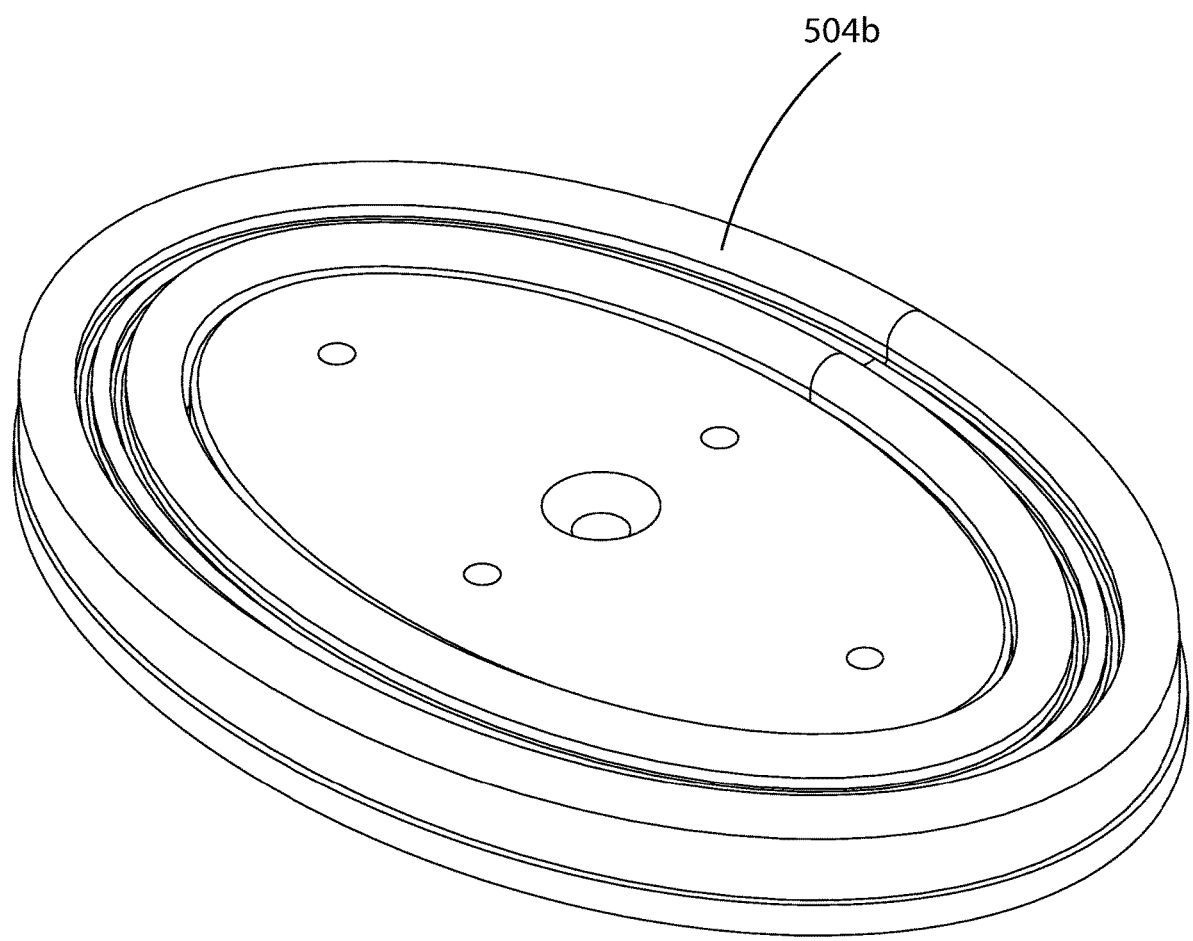
FIG. 5B is an apparatus for binding with a oval-shaped flexible member.

The shape of the flexible member 104 and 204 should not be considered limiting. For example, the cross-sectional shape of the flexible member may be, for example, a circle as illustrated by flexible member 104 in FIGS. 1A-D, and flexible member 204 in FIGS. 2A-B and 3A-D, a rectangle as illustrated by flexible member 504a in FIG. 5A, an oval as illustrated by flexible member 504b in FIG. 5B, a triangle, a polygon with more than four sides, other shapes, and/or combinations thereof. Additionally, the flexible member 104, 204 may or may not be continuous shape encompassing the recess. For example, the flexible member 104 and/or 204 as illustrated in FIGS. 1A-D and FIG. 2-B can be continuous such that the shape of the respective flexible member, 104 and 204, can encompass the respective recess, 116 and 216. In various examples, the shape of the flexible member 104, 204 may be discontinuous and contain a discontinuity. For example, the flexible member 104, 204 may have a "C" shape. Regardless, of the shape of the flexible member 104, 204, the flexible member 104, 204 can be configured to mate with the select surface such that fluid transfer between the recess and the environment can be limited, and in some examples prevented such that fluid transfer into and/or out of the recess is limited to the fluid port.

Figure 6A:
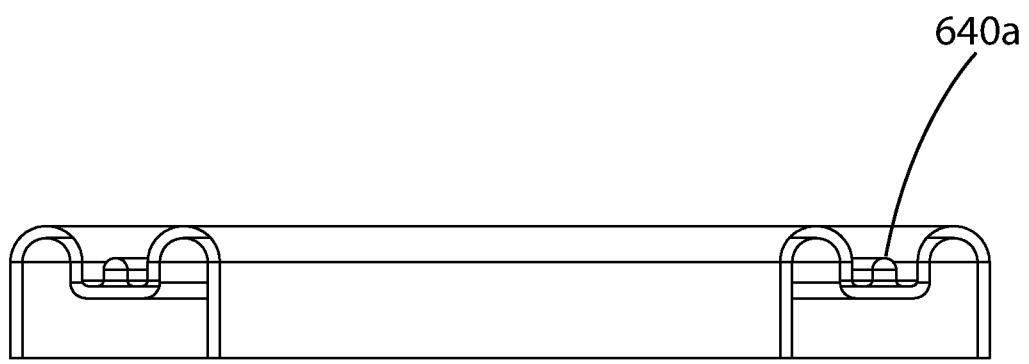
FIG. 6A is a cross-sectional view of a flexible member with a rounded sealing member.
Figure 6B:
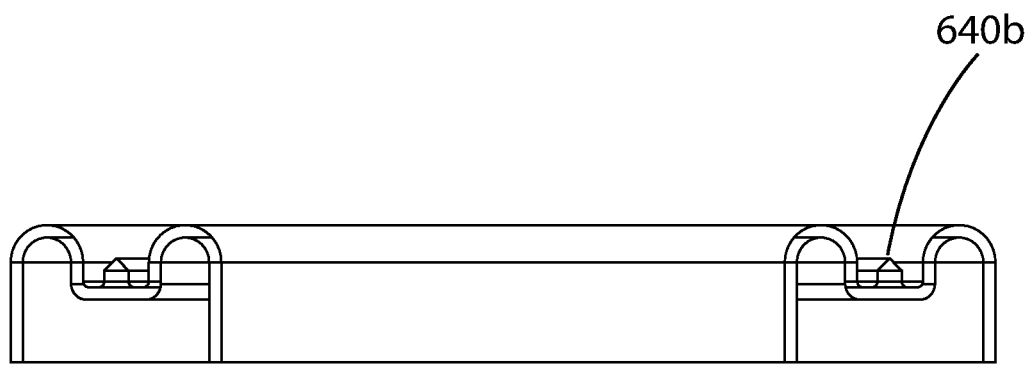
FIG. 6B is a cross-sectional view of a flexible member with a narrowed point sealing member.

The shape of the sealing member 140 should not be considered limiting. In various examples, the shape of the sealing member 140 may have a cross sectional shape of, for example, a square with rounded corners as illustrated by sealing member 140 in FIGS. 1A-D and a sealing member 240 in FIGS. 2A-B and 3A-D, rounded as illustrated by sealing member 640a in FIG. 6A, a narrowed point as illustrated by sealing member 640b in FIG. 6B, other shapes, and/or combinations thereof.

Figure 7:
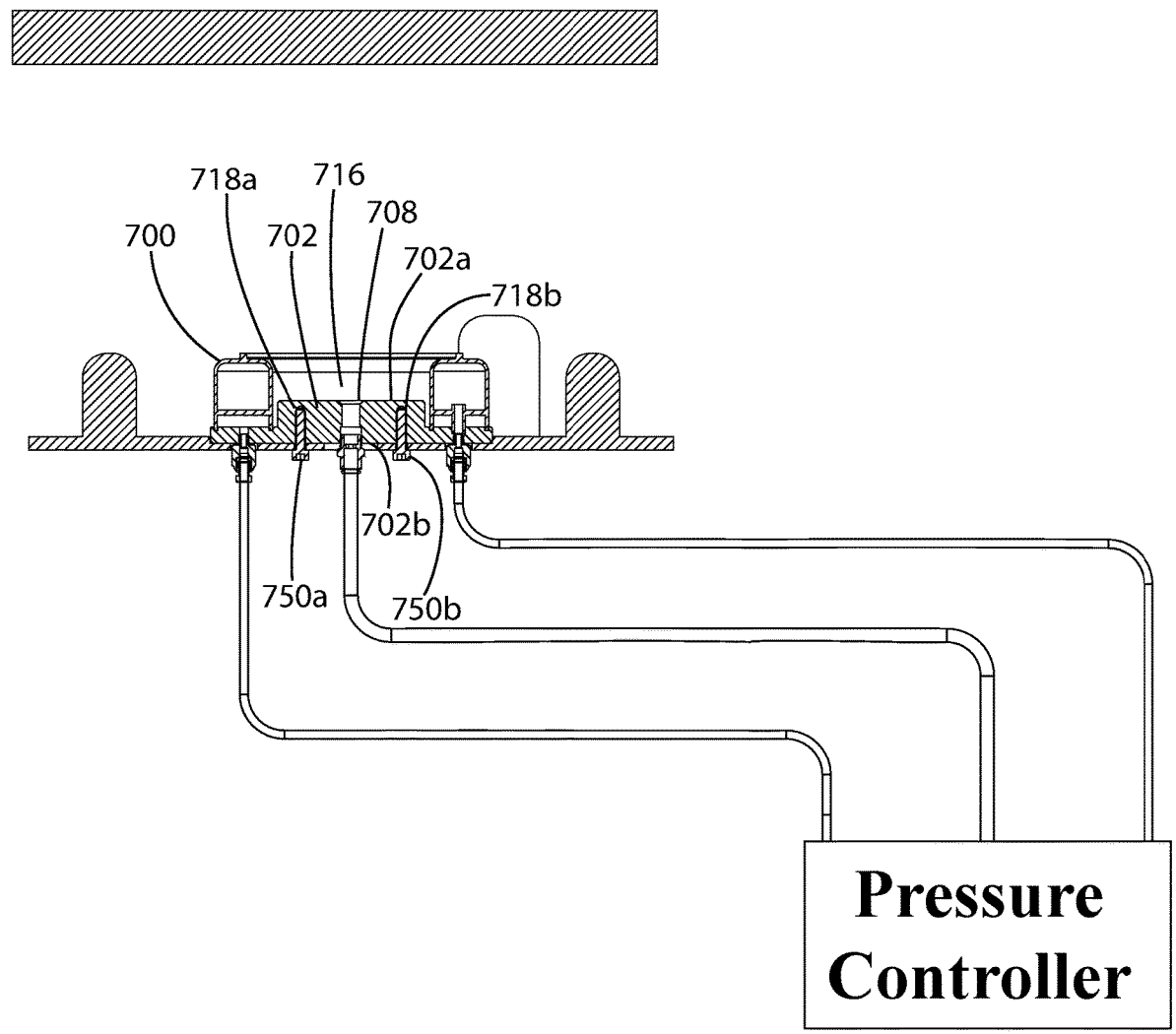
FIG. 7 is a cross-sectional view of an apparatus for binding.

In various examples, as illustrated in FIG. 7, an apparatus 700 for binding can comprise a hole 718a and a hole 718b.

The holes 718*a-b* can partially traverse a body 702 of the apparatus 700. For example, each hole 718*a-b* can extend from a distal surface 702*b* of the body 702 and into the body 202. Each hole 718*a-b* can terminate prior to a proximal surface 702*a* of the body 702. In various examples, the proximal surface 702*a* of the body can be free of holes except for the fluid port 708.

Referring to FIGS. 2A-B, in order to generate the binding pressure within the recess 216, the fasteners 250*a-d* can be provided with an application of sealant. Referring to FIG. 7, hole 718*a* can be configured to receive fastener 750*a* and hole 718*b* can be configured to receive fastener 750*b*. In order to generate the binding pressure within a recess 716, an application of sealant to the fasteners 750*a-b* may not be required since the holes 718*a-b* do not traverse through the body 702 and terminate prior to the proximal surface 702*a*. Accordingly, the configuration of the holes 218*a-d*, 718*a-b* is for illustration purposes and should not be considered limiting.

Figure 8:
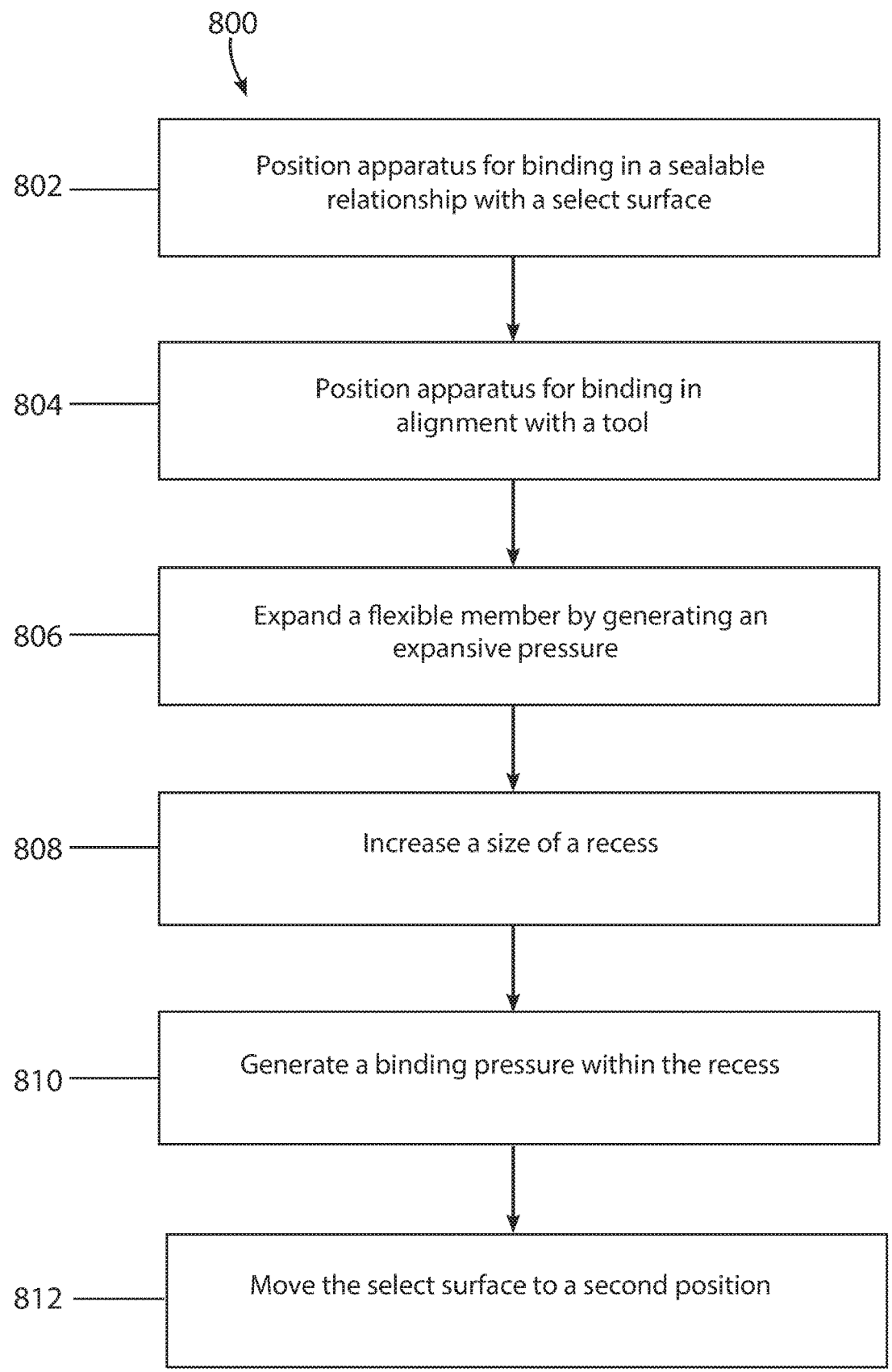
FIG. 8 is a flow chart illustrating a method for binding a select surface to an apparatus.

Referring to FIG. 8, a flow chart 800 is provided illustrating a method for binding a select surface to an apparatus for binding. The apparatus for binding is positioned in a sealable relationship with the select surface 802. The apparatus for binding can be the apparatus 100 for binding, apparatus 200 for binding, one or more of apparatuses 400*a-i* for binding, combinations thereof, or various other configurations that may now be contemplated to those of ordinary skill in the art. In various examples, the positioning of the apparatus for binding includes placing the apparatus for binding into alignment with a tool in communication with the apparatus for binding 804. For example, the select surface can be positioned in contact with the apparatus for binding and/or a tab stop of the tool. Because the apparatus for binding is in the first configuration, the select surface can be easily positioned into alignment and/or slide along a contact surface of the tool.

The flexible member is expanded by generating an expansive pressure within the cavity of the flexible member 806. In various examples, a size of the recess is increased responsive to expansion of the flexible member 808. A binding pressure is generated within the recess to bind the select surface in a first position to the apparatus for binding 810. In various examples, the binding pressure creates a suction force between the apparatus for binding and the select surface.

In various examples, the select surface is moved to a second position 812. In various examples, the second position is closer to the body than the first position. Moving the select surface to the second position includes contracting the flexible member by generating a contractive pressure within the cavity of the flexible member. In various examples, the binding pressure within the recess can be maintained during the moving of the select surface from the first position to the second position. Accordingly, the apparatus for binding can be used for accurate, efficient, and/or repeated placement of a select surface in alignment with a tool.

In various examples, active control of the configurations of the apparatus 100/200 can enable an efficient automated process. For example, the configuration of the apparatus 100/200 can dynamically and/or automatically be controlled corresponding to the automated process. In various examples, the apparatus 100/200 can be dynamically and/or automatically configured in the first configuration to enable accurate and/or efficient placement of a workpiece in alignment with a tool having the apparatus 100/200. Thereafter, upon alignment of the workpiece with the tool, the apparatus 100/200 can be dynamically and/or automatically configured in the second configuration to form a sealable relationship with the workpiece and/or otherwise engage the workpiece. Additionally, after formation of the sealable relationship, the apparatus 100/200 can be dynamically and/or automatically configured in the third configuration to apply a hold-down force to the workpiece. In the third configuration, the workpiece can be subjected to an operation such as, for example, processing, movement, and/or combinations thereof. After the operation, the apparatus 100/200 can be configured to automatically and/or dynamically release the hold-down force and/or return to the first configuration. After returning to the first configuration, the apparatus 100/200 can be ready to engage a subsequent workpiece and repeat the accurate and/or efficient placement thereof. The sequencing of the apparatus 100/200 configurations should not be considered limiting and the pressure within the recess and the pressure within the flexible member can be dynamically and/or automatically be adjusted in order to facilitate the automated process.

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various examples have been described herein, many modifications, variations, substitutions, changes, and equivalents to those examples may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed examples. The following claims are intended to cover all such modification and variations.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more examples has been presented for purposes of illustration and description. It is not intended to be exhaustive or limiting to the precise form disclosed. Modifications or variations are possible in light of the above teachings. The one or more examples were chosen and described in order to illustrate principles and practical application to thereby enable one of ordinary skill in the art to utilize the various examples and with various modifications as are suited to the particular use contemplated. It is intended that the claims submitted herewith define the overall scope.

While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

What is claimed is:

1. An apparatus for binding to a select surface comprising:
a body having a proximal surface configured with a fluid port;
a flexible member operatively coupled to the body to form a seal with the body, the flexible member having at least two chambers including a first chamber and a second chamber;
the first chamber having a first cavity therein, the first chamber is configured to contract responsive to a first contractive pressure within the first cavity;
the second chamber having a second cavity therein, the second chamber is configured to expand responsive to a first expansive pressure within the second cavity;
a recess formed by the proximal surface and the flexible member; and
the fluid port is configured to facilitate generation of a binding pressure within the recess.

2. The apparatus of claim 1, wherein the first chamber further comprises a first pressure port, the second chamber further comprises a second pressure port, and a pressure controller operatively coupled to at least one of the first pressure port, the second pressure port, and the fluid port.

3. The apparatus of claim 1, wherein the first chamber is configured to expand responsive to a second expansive pressure within the first cavity, the first contractive pressure is less than the second expansive pressure, and the second chamber is configured to contract responsive to a second contractive pressure within the second cavity, the second contractive pressure is less than the first expansive pressure.

4. The apparatus of claim 1, wherein a size of the recess increases when the first chamber expands and wherein the recess has a concave shape.

5. The apparatus of claim 1, wherein the flexible member is deformable responsive to contact with the select surface in order to form a seal with the select surface.

6. The apparatus of claim 5, wherein the second cavity has the first expansive pressure, and responsive to formation of the seal with the select surface and generation of the binding pressure within the recess, the select surface is in a sealable relationship with the apparatus in a first position relative to the body.

7. The apparatus of claim 6, wherein when the first cavity has the first contractive pressure, the flexible member is configured to move the select surface from the first position to a second position relative to the body, wherein the second position is closer to the body than the first position.

8. The apparatus of claim 1, further comprising a sealing member operatively coupled to the flexible member, the sealing member configured to form a seal with the select surface.

* * * * *